United States Patent [19]
Brudnicki et al.

[11] Patent Number: 5,529,281
[45] Date of Patent: Jun. 25, 1996

[54] DUAL-LATCHING SOLENOID-ACTUATED VALVE ASSEMBLY

[75] Inventors: Myron J. Brudnicki, San Pedro; Jefferson Y. Yang, Orange, both of Calif.

[73] Assignee: The United States of America as represented by the Administrator of National Aeronautics and Space, Washington, D.C.

[21] Appl. No.: 296,551

[22] Filed: Aug. 24, 1994

[51] Int. Cl.[6] .................................................. F16K 31/08
[52] U.S. Cl. .................. 251/129.03; 251/65; 251/129.1; 251/129.21
[58] Field of Search .................. 251/129.03, 129.15, 251/129.21, 129.02, 129.01, 65, 129.1, 129.09

[56] References Cited

U.S. PATENT DOCUMENTS

| | | | |
|---|---|---|---|
| 2,308,285 | 1/1943 | Jeffrey et al. | 251/129.03 |
| 3,502,105 | 3/1970 | Ernyei et al. | 251/129.21 X |
| 5,351,934 | 10/1994 | Jensen et al. | 251/65 |

Primary Examiner—Kevin Lee
Attorney, Agent, or Firm—Robert L. Broad, Jr.

[57] ABSTRACT

A tube-type shutoff valve is electrically positioned to its open or closed position by a concentric electromagnetic solenoid. The valve is dual latching in that the armature of the solenoid maintains the sliding tube of the valve in an open or closed position by means of permanent magnets which are effective when current is not supplied to the solenoid. The valve may also be actuated manually.

11 Claims, 1 Drawing Sheet

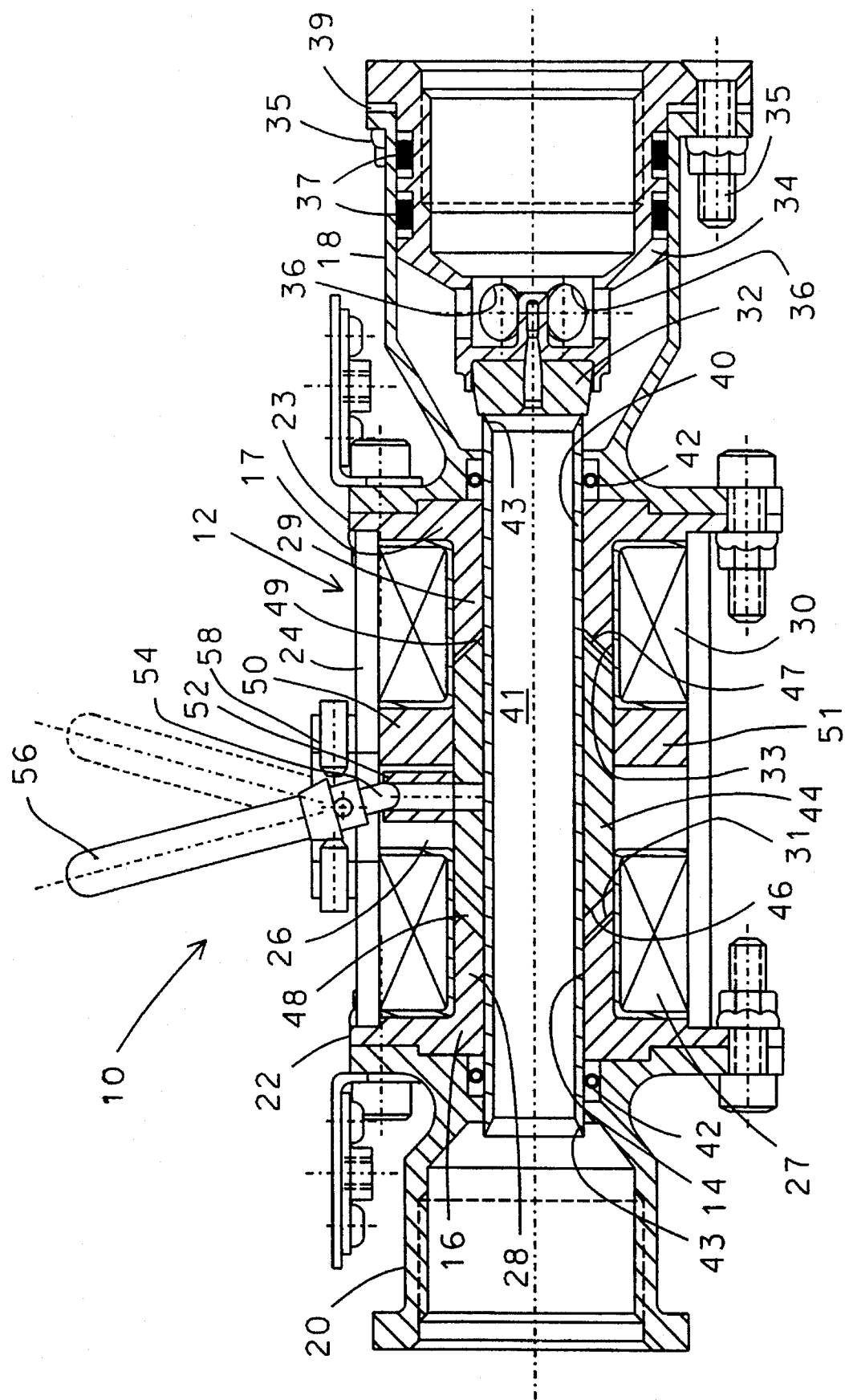

DUAL-LATCHING SOLENOID-ACTUATED VALVE ASSEMBLY

ORIGIN OF THE INVENTION

This invention was made with government support under contract NAS 8-50000 awarded by the National Aeronautics and Space Administration. The Government has certain rights in this invention.

BACKGROUND OF THE INVENTION

1. Field of the Invention

This invention relates generally to the field of high pressure valves and more specifically to a tube-type valve which may be actuated electrically by a solenoid, or manually by a toggle lever. The valve is dual latching in that it holds its position by use of magnetic force until it is actuated.

2. Description of Related Art

While the use of slide valves of various types is well known, no such valve is known to utilize a magnetically latched sliding tube which may be electrically or manually actuated.

SUMMARY OF THE INVENTION

The present invention is directed to a tube-type valve which may be electrically operated by means of a solenoid or alternatively by manual means. In either case the tube portion of the valve is latched in a selected open or closed position by means of force provided by strategically positioned permanent magnets.

More specifically, a slidable tube is mounted in sealed relation within a cylindrical housing. An armature surrounds and is attached to the tube intermediate its ends, and permanent magnets are attached to the radially outer surface of the armature. A valve housing is configured to receive a pair of concentric solenoidal electromagnetic windings around the radially outer portion thereof. Each winding is spaced apart axially from the other and is located generally toward the axial ends of the tube and the housing. The permanent magnets are positioned intermediate the solenoid windings, and an actuator stub is attached to the armature adjacent the magnets. The housing also includes a pair of pole pieces, each of which encircles the tube adjacent the ends thereof and serves to support the solenoid windings. The pole pieces are axially positioned to provide a gap between axially inner surfaces of the pole pieces and axially outer surfaces of the armature. An outer support cylinder surrounds the solenoid windings and is attached to the radially outer portion of each of the pole pieces. A manual toggle lever is pivotally attached to the outer support cylinder intermediate the axial ends thereof and is positioned to pivotally engage the actuator stub whereby lateral operation of the lever will move the tube axially within the housing. As the tube and its armature are moved axially the size of the gaps between the axial outer surfaces of the armature and the axial inner surfaces of the pole pieces will vary inversely with the direction of movement of the tube and its armature. The flux from the permanent magnet keeps the armature attracted to the pole piece from which it is separated axially by the smaller gap, thereby latching the tube toward the direction of the smaller gap. Thus by manual movement of the toggle lever the axial position of the tube may be reversed and latched by reversing the axial position of the tube so as to move the smaller gap from one axial end of the armature to the other.

In electrical operation of the device, a current is applied to the solenoid winding nearest the larger of the gaps. This current sets up a flux that opposes the permanent magnet flux in the smaller gap and creates a flux in the larger gap which results in a greater force across the larger gap, which force draws the armature from the smaller gap toward the larger gap. As the larger gap becomes the smaller gap, the current is removed and the tube is latched in its new position by the permanent magnet.

The cylindrical housing includes an inlet and an outlet at opposite axial ends thereof. The inlet end is provided with a valve seat which is mounted for contact with the tube when the tube is positioned axially in a latched position in a direction toward the valve seat. When in this position the valve is closed. When the tube is positioned away from contact with the valve seat the valve is open. The valve seat is mounted so as to permit axial fluid flow around its periphery and through the tube when the tube is in an open position, and to prevent fluid flow through the tube when the valve is in its closed position.

The valve also includes two Hall-effect sensors that indicate its open or closed position on a remote display panel; these sensors respond to a small permanent magnet on the armature. The position of the toggle lever also indicates the open or closed position of the valve.

BRIEF DESCRIPTION OF THE DRAWINGS

The drawing is an elevational view illustrated partly in section.

DESCRIPTION OF THE PREFERRED EMBODIMENT

Referring now to the drawing, a dual latching solenoid actuated valve is referred to generally by the numeral 10. The valve includes a cylindrical housing assembly referred to generally by the numeral 12. The housing 12 includes a cylindrical opening 14 which is formed by a pair of pole pieces 16 and 17, and by an inlet portion 18 and an outlet portion 20 each of which is rigidly connected to one of said pole pieces. The pole pieces 16 and 17, are each configured generally as a right angle in cross section, and are rigidly attached to one another at radially outward legs 22 23 thereof by a cylindrical support member 24. This arrangement provides a cavity 26 formed by the support member 24 and the pole pieces 16. and 17. The pole pieces 16 and 17 also include a pair of radially inner legs 28 and 29 which are provided with tapered ends 31 and 33 respectively. A pair of generally concentric solenoidal electromagnetic windings 27 and 30 are generally rectangular in cross section, and are positioned in spaced apart relation at opposite ends of the cavity 26. Each of the windings 27 and 30 is thus positioned adjacent one of the pole pieces 16 and 17. A valve seat 32 is generally aligned with the axis of the opening 14, and is supported in the inlet portion 18 by a valve support member 34, which is provided with openings 36 for the passage of fluid therethrough. The support member 34 is retained by bolts 35 and is sealed to inlet 18 by a pair of seals 37. A selection of shims 39 are provided for adjustment of the axial position of the valve seat 32.

A tube 40 is positioned in the opening 14 of the housing 12. A pair of seals 42 are positioned, one adjacent each of the inlet and outlet ends of the housing. These seals 42 provide a sealed and slidable engagement between the tube 40 and the housing 12. Tube 40 defines a passage 41 therethrough and is provided at each end thereof with a tapered portion 43. A generally cylindrical armature 44 is rigidly attached to tube 40. The armature 44 is provided with a pair of tapered ends 46,47 which are configured to match the taper of the ends 31,33 of the pole piece legs 28,29, and to provide a pair of gaps 48 and 49 between ends 46, 47 of the armature 44 and ends 31,33 of pole piece legs 28,29. Permanent magnets 50,51 are attached to the armature 44 and are strategically positioned around the armature so as to provide the most effective use of the magnets with respect to the latching function of the magnets, and with respect to the interaction between the magnets and the electromagnetic solenoid windings. An actuation stub 52 is attached to and extends radially outwardly from the armature 44 and is adapted for reception of the actuator arm 54 of a manual toggle lever 56, which is pivotally connected to the support member 24 by a pivot mount 58.

In operation of the valve assembly the tube 40 slides axially closing off fluid flow when it is held against the valve seat 32 and allowing flow when it is backed away from the seat. With this arrangement it is simple to balance the pressure on the seal between the seat 32 and the tapered edge 43 of the tube 40. With a pressure balanced seal, only a small force is needed to hold the valve in position, regardless of the pressure acting on the valve. For example, in a typical valve assembly of the type disclosed herein, the force needed to move the tube at an inlet pressure up to 1,000 pounds per square inch is less than 5 pounds at a valve stroke of 0.093 inches. This pressure-balanced tube valve is therefore well suited to actuation by a solenoid. The precise shape required for pressure balance is ensured by first centerless-grinding the tube 40, then cutting the sealing end perpendicular to its outer wall, then sharpening (tapering) the end so that the diameter of its seating edge is at the radially outer surface thereof very close to the sealing diameter of the seat. The magnets 50,51 latch the armature 44 and tube 40 in the open or closed valve position with a force of approximately 14 pounds. It will be noted that the magnets 50,51 increase the force as the tube penetrates the seat and the armature 44 approaches the pole piece 17 more closely. The shims 39 are used to adjust the position of the valve seat 32 relative to the inlet end of the tube 40 to obtain the desired penetration of the tube into the seat. Thus a variety of seat materials can be accommodated ranging from soft to hard. The valve assembly 10 utilizes the manual toggle switch 54,56 to over-ride the permanent magnet latch when an operator pushes the end of the toggle lever 56 with a force of about 3 pounds. Because the toggle always moves in unison with the tube, the lever 56 provides a visual indication of the position of the valve. In addition, the valve contains two Hall-effect sensors (not shown) that indicate the open or closed state of the valve on a remote display panel; these sensors respond to a small permanent magnet (not shown) on the armature. The latching (permanent) magnets 50,51 are mounted between the two solenoid windings 27,30 that encircle the tube 40. When no electrical power is supplied to either winding the flux from the permanent magnets keeps the armature attracted to the pole piece from which it is separated longitudinally by the smaller gap, thereby latching the tube open or closed. Only a small force is needed to change the position however. This is because, when current is applied to the winding near the larger gap, it sets up a flux that opposes the permanent-magnet flux in the smaller gap and provides a flux in the larger gap that creates an attractive force across this gap, thereby moving the armature to decrease the size of the larger gap. As this gap becomes smaller an increasing part of the permanent-magnet flux passes through it, providing an assist to the electromagnetic force and establishing a new latched position. Because it is necessary to energize the solenoid coil for only about 20 ms to establish the new latched position, little electrical energy is consumed in the process.

It is of course understood that specific examples of operation such as those provided above apply only to a specific valve configuration and are not intended to be all encompassing. Obviously, numerous modifications and variations of the present invention are possible in light of the above teachings. It is therefore to be understood that within the scope of the appended claims the invention may be practiced otherwise than as specifically described herein.

We claim:

1. A valve assembly comprising:

a housing having an inner portion including a longitudinal opening therein, an outer portion, an inlet and an outlet;

a valve seat rigidly attached to the inlet of said housing;

a hollow member having a passage therethrough mounted in slidable and sealed relation with said inner portion within said longitudinal opening and disposed for longitudinal movement so as to provide selective contact between one end of said hollow member and said valve seat so as to close said passage when contact is made between said hollow member and said valve seat and to open said passage when said contact is discontinued;

at least one actuating means for actuating said hollow member so as to selectively open or close said passage; and magnetic means for retaining said hollow member in a selected open or closed position.

2. A valve assembly as set forth in claim 1 wherein one said actuating means includes a manual means.

3. A valve assembly as set forth in claim 2 wherein said manual means includes a toggle lever pivotally attached between said housing and said hollow member.

4. A valve assembly as set forth in claim 1 wherein said means for actuation of said hollow member includes an electromagnetic solenoid.

5. A valve assembly as set forth in claim 2 wherein said means for actuation of said hollow member further includes an electromagnetic solenoid means.

6. A valve assembly as set forth in claim 5 wherein said hollow member is configured so as to provide a sharpened portion on the end thereof which contacts said valve seat.

7. A valve assembly comprising:

a generally cylindrical housing having an inner portion, an outer portion, an inlet end and an outlet end; said outer portion of said housing being adapted for reception of an solenoidal electromagnetic winding at each end thereof;

a tube slidably mounted within the inner portion of said housing and in sealed relation thereto;

armature means including permanent magnets attached to said tube generally intermediate the ends thereof and generally intermediate and radially inwardly of said solenoidal electromagnetic windings, said armature being disposed on each end thereof in spaced relation with the inner portion of said housing whereby said armature will be attracted by said permanent magnets for movement in the direction of the smallest space between the armature and the inner portion of the housing; and a valve seat mounted in the inlet end of said housing and positioned to contact said tube when said tube is drawn in the direction of said valve seat by said permanent magnets, and whereby attraction of said permanent magnets may be overcome by a temporary supply of an electrical current to the one of said solenoidal electromagnetic windings which is located most distant from said smallest space so as to draw the tube in a direction opposite to that of the position of the tube prior to the temporary supply of said electrical current.

8. A valve assembly as set forth in claim 7 wherein a lever is pivotally attached to the outer portion of said housing and is disposed for engagement with said tube so as to provide an manual means for slidable movement of said tube.

9. A valve assembly as set forth in claim 8 wherein said tube is tapered to a sharpened edge at its point of contact with said valve seat.

10. A valve assembly as set forth in claim 9 wherein said tapered tube includes a radially inner surface and a radially outer surface, and wherein said tapered tube is tapered, beginning from the radially inner surface and terminating at the radially outer surface so as to form said sharpened edge at the radially outer surface of said tapered tube.

11. A valve assembly as set forth in claim 7 wherein adjustment means are disposed in the inlet end of said housing for axial adjustment of said valve seat.

* * * * *